United States Statutory Invention Registration [19]

[11] Reg. Number: H490

Ebbrell [43] Published: Jul. 5, 1988

[54] DETERMINATION OF THE DENSITY OF A HYDROCARBON LIQUID AT ELEVATED PRESSURE

[75] Inventor: Harold K. Ebbrell, Chester, England

[73] Assignee: Shell Oil Company, Houston, Tex.

[21] Appl. No.: 33,984

[22] Filed: Apr. 2, 1987

[30] Foreign Application Priority Data

Apr. 2, 1986 [GB] United Kingdom ..... 8608054

[51] Int. Cl.[4] ..... G01N 9/04

[52] U.S. Cl. ..... 73/433

[58] Field of Search ..... 73/433, 434, 32 R

[56] References Cited

U.S. PATENT DOCUMENTS

| | | | |
|---|---|---|---|
| 2,746,284 | 5/1956 | Posey et al. | 73/32 |
| 3,229,503 | 1/1966 | Poole et al. | 73/32 |
| 4,429,572 | 2/1984 | Cucuiat et al. | 73/433 |
| 4,570,476 | 2/1986 | Davis | 73/1 R |

*Primary Examiner*—Stephen C. Buczinski

*Assistant Examiner*—Linda J. Wallace

[57] ABSTRACT

A method and apparatus are provided whereby a pressure vessel of known internal volume is filled with a hydrocarbon liquid at elevated pressure and a measured temperature. When filled, a valve to a connected buffer vessel is opened to prevent any risk of overpressure caused by a rise in temperature after filling. The whole assembly is weighed before and after filling. The difference in mass, divided by the known internal volume of the vessel and associated pipework, provides the density of the confined hydrocarbon liquid.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

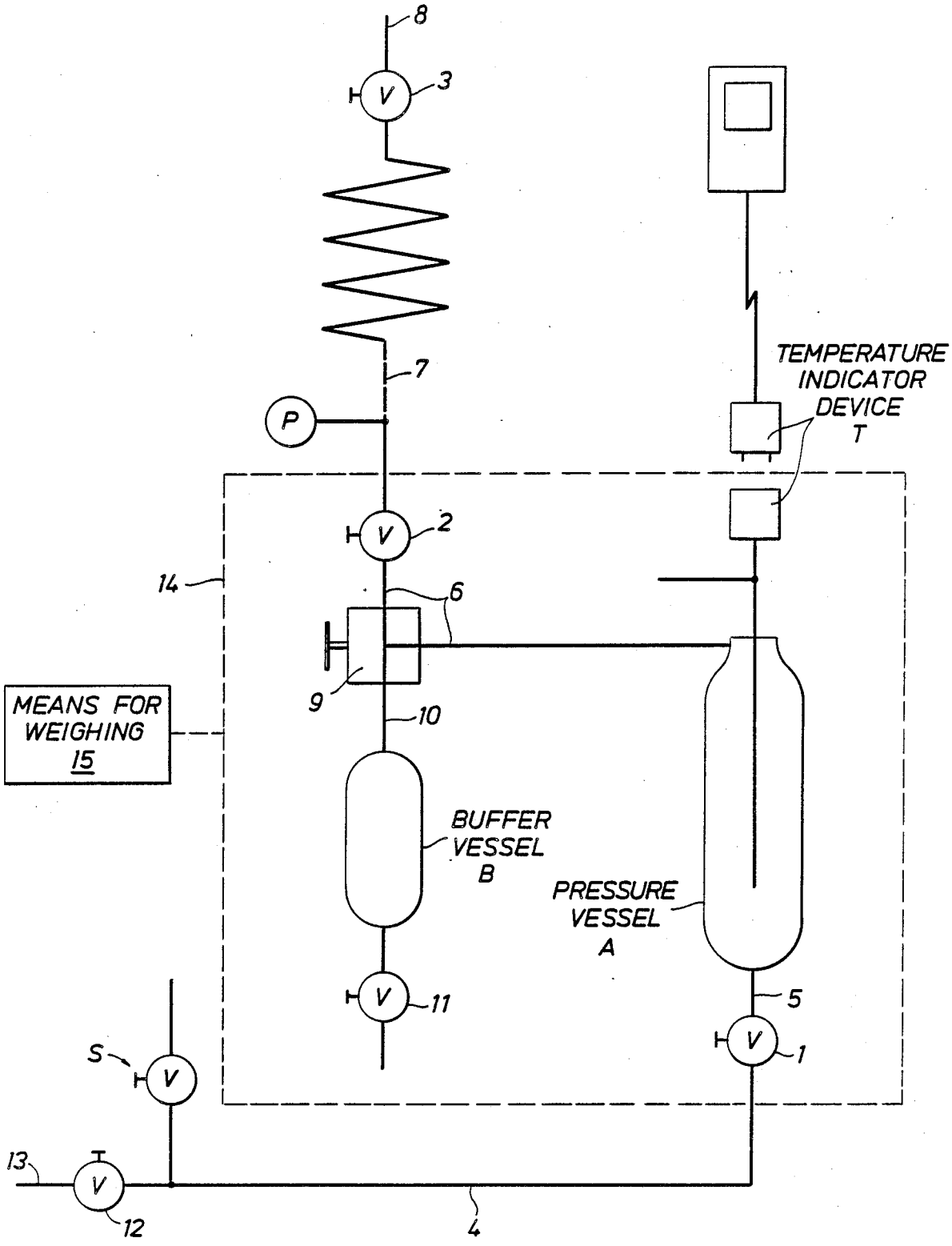
8
3
V
7
P
TEMPERATURE
INDICATOR
DEVICE
T
2
14
6
9
10
MEANS FOR
WEIGHING
15
BUFFER
VESSEL
B
PRESSURE
VESSEL
A
11
5
1
S
13
12
4

DETERMINATION OF THE DENSITY OF A HYDROCARBON LIQUID AT ELEVATED PRESSURE

BACKGROUND OF THE INVENTION

The invention relates to density determination of hydrocarbon liquids at elevated pressure.

In oil and gas production operations it is often desired to obtain reliable data on the characteristics of the fluid produced at exposed locations in the field. A particular problem is the density measurement of hydrocarbon liquids i.e. crude oils, gas condensate, LPG's at elevated pressure in production or test separators or in process vessels/lines. Furthermore, the presence of electric measuring instruments is unwanted in hazardous areas while the maintenance and calibration of complicated measuring devices may create considerable difficulties in terms of downtime of production, etc.

In view thereof, known densitometers such as mass flow meters in combination with volume flow meters and fluid sampling loops that require circulation pumps cannot be applied at many locations and the need exists for simple and reliable measuring techniques.

SUMMARY OF THE INVENTION

Therefore it is an object of the present invention to provide an apparatus and a method for determining the density of a hydrocarbon liquid at elevated pressure in a safe and accurate manner without recourse to expensive instrumental methods or special installations.

The apparatus according to the invention comprises:

a calibrated pressure vessel and a buffer vessel;

a fluid inlet conduit and a fluid outlet conduit, which conduits are each connected to the pressure vessel, and an elongate exhaust conduit being arranged downstream of the fluid outlet conduit;

a first valve for forming and interrupting fluid communication between said inlet conduit and a fluid supply, a second valve means for forming and interrupting fluid communication between said fluid outlet conduit and the elongate exhaust conduit, a third valve arranged in the exhaust conduit near the downstream end thereof, and a three-way valve arranged in the fluid outlet conduit for switching fluid flow from said pressure vessel either into the exhaust conduit or into the buffer vessel.

The apparatus further comprises means for disconnecting the first valve from the fluid supply, means for disconnecting the second valve from the elongate exhaust conduit, and means for measuring the weight of the contents of the pressure vessel, the buffer vessel and of said inlet and outlet conduits.

In accordance with another aspect of the invention, there is provided a method of determining the density of a hydrocarbon liquid at elevated pressure using the apparatus. This method comprises of steps of:

opening said first, second and third valves and allowing hydrocarbon liquid to flow from the fluid supply via the inlet conduit, pressure vessel and outlet conduit into the elongate exhaust conduit;

continuing said flow at least until the liquid passes through said third valve;

closing said first and second valves and linking the pressure vessel with the buffer vessel by switching the three-way valve;

disconnecting the first valve from the fluid supply, disconnecting the second valve from the fluid exhaust conduit;

determining the mass of the liquid contained in said pressure and buffer vessel and in said inlet and outlet conduit, and calculating the density of the contained liquid using the liquid mass thus determined.

BRIEF DESCRIPTION OF THE DRAWINGS

The invention will now be explained in more detail with reference to the accompanying drawing in which FIG. 1 illustrates a density sampling apparatus according to the invention.

A DETAILED DESCRIPTION OF THE PREFERRED EMBODIMENT

The apparatus shown in the drawing comprises a flow circuit in which a first, second and third valve are arranged, which valves are indicated by the reference numerals 1, 2 and 3, respectively. The first valve 1 interconnects a fluid supply conduit 4 with a fluid inlet conduit 5.

The second valve 2 interconnects a fluid outlet conduit 6 and an elongate exhaust conduit 7, (which may exceed 5 meters in length) and the third valve 3 is a flow control valve which is arranged near the downstream end 8 of said elongate exhaust conduit 7. Between valves 1 and 2 there is mounted a pressure vessel A of known internal volume, fluid inlet conduit 5 and the fluid outlet conduit 6. The fluid outlet conduit is provided with a three-way valve 9 for directing a fluid stream flowing from the pressure vessel A either into the exhaust conduit 7 or into a buffer vessel B via conduit section 10. The buffer vessel B is provided with a fluid drainage valve 11, which valve 11 is normally closed. The apparatus is further equipped with a temperature indicator device T which is mounted in the pressure vessel A, a pressure gauge P which is secured to the elongate exhaust conduit 7, and a high pressure gas supply S. The gas supply S is connected to the fluid supply conduit 4 at a location between the first valve 1 and a main valve 12 which is located close to a sampling point 13 of a production separator or process line (not shown) containing a hydrocarbon liquid at high pressure.

The apparatus operates as follows.

First the assembly of vessels A, B, conduits 5, 6 and valves 1, 2, 9 and 11, which assembly is in the drawing enclosed by the chain line 14, is disconnected from the fluid supply and exhaust conduits 4 and 7. Subsequently the assembly, when disconnected at valves 1 and 2 from supply and exhaust conduits 4 and 7 and with valves 1, 2 and 11 open, is filled with air at measured atmospheric pressure and ambient temperature. Subsequently the assembly is weighed with valves 1, 2 and 11 closed. Then, after connecting valves 1 and 2 to the fluid supply and exhaust conduits 4 and 7, and before filling the vessels and conduit system with the high pressure hydrocarbon liquid it is preferred to purge any air from the system and to pressurize the system, excluding vessel B and conduit 10, using high pressure gas obtained from the high pressure gas supply S. When purging the system with the high pressure gas, valve 11 is closed, valves 1 and 2 are opened and the three-way valve 9 isolates the conduit section 10 and buffer vessel B from the outlet conduit 6. During the initial stage of purging valve 3 is at least partly opened to enable any air that may be present in the system to escape, whereupon valve 3 is closed to bring the system to the desired pressure.

Then the high pressure gas supply S is switched off and valve 12 is opened while the three-way valve isolates the buffer vessel B from the pressure vessel A. Subsequently the flow control valve 3 is at least partly opened thereby allowing hydrocarbon liquid to enter the conduits 5, 6 and 7 and pressure vessel A.

Purging of the pressure vessel A and associated conduits 5, 6 and 7 continues until the hydrocarbon liquid flows out of the downstream end 8 of the elongate exhaust conduit 7 and the temperature indicated by sensor T is constant. When this occurs valves 1, 2 and 3 are closed and the vessels A and B are linked by turning the three-way valve 9. Linking of pressure vessel A with the buffer vessel B prevents any over-pressure of the hydrocarbon liquid in vessel A after closing valves 1 and 2 caused by a rise in temperature after filling.

Subsequently valve 12 is closed, and valves 1 and 2 are disconnected from the fluid supply and exhaust conduits 4 and 7, respectively, and the assembly of vessels A, B, conduits 5, 6 10 and valves 1, 2, 9 and 11 is weighed with a means 15 for measuring the weight of the contents of the assembly.

The difference in mass between the empty (correcting for weight of air in vessel A) and liquid-filled assembly is used, together with the pre-calibrated volume of the interior of the assembly to calculate the density of the hydrocarbon liquid at the temperature and pressure measured during filling of the assembly.

It is observed that the above-described step of pre-pressurization of the assembly with a high-pressure gas may be possible when sampling process separators, but will not normally be possible on process lines.

When the gas in equilibrium with the hydrocarbon being sampled is not available, the system must be pre-purged with hydrocarbon liquid only and, in this case, it is desirable for the fluid to flow through the system for a longer time to ensure that the fluid sample is representative and unaffected by the instability caused by the flashing of gas from the hydrocarbon liquid into vessel A at the initially low transfer pressure.

It is obviously important to carry out the pre-purging and filling procedures slowly to eliminate any pressure drop between the vessel, or line, being sampled and valve 2, which could cause gas to flash and the liquid sample to be unrepresentative. It follows that the distance between the sampling point 12 and valve 1 should be as short as possible.

Ideally, the temperature of measurement should be the same as that of the bulk fluid in the production separator or process line but often this temperature is not known accurately. Insulation and/or immersion of the whole assembly in a Dewar vessel will minimize large temperature changes if the fluid temperature is significantly different from ambient. The determined density is finally defined for the indicated temperature in vessel A when filled with hydrocarbon liquid.

The system was tried out at Bacton terminal (U.K.) and used in the field for the first time as an element of a comprehensive test programme in Qatar. The volumes of vessel A and B (including piping) were 155.9 $cm^3$ and 30 $cm^3$ respectively. The Bacton tests demonstrated feasibility, whereas the tests in Qatar determined the density of natural gas liquids at 106–138 bar and 32°–41° C. Purging the system with liquid was practiced as no suitable gas supply was available. Very good duplication was obtained. Erratically high densities were obtained, however, when liquid was allowed to flash directly to atmospheric pressure across valve 2. This phenomenon was found to be caused by the cooling effect of the expansion occurring at this valve causing local cooling of the weighed volume and an apparent increase in density, and its effects were eliminated by attaching a length of about 8 m of 6.5 mm outer diameter exhaust conduit 7 downstream of valve 2 and controlling the flow of liquid through the system using valve 3 as a flow control valve and with valve 2 fully open. The exhaust conduit 7 is shown coiled in the drawing although this configuration is not essential for its operations.

The presence of the elongate exhaust conduit 7 between valves 3 and 5 also permits a pressure gauge P to be located in this conduit to assist the operator to avoid pressure drop during filling. A pressure gauge cannot be inserted between valves 1 and 2 because the likely variable liquid hold-up in the gauge would cause inaccurate weighings.

What is claimed is:

1. An apparatus for determining the density of a hydrocarbon liquid at elevated pressure, the apparatus comprising:

a calibrated pressure vessel and a buffer vessel;

a fluid inlet conduit and a fluid outlet conduit, which conduits are each connected to the pressure vessel, and an elongate exhaust conduit being arranged downstream of the fluid outlet conduit;

a first valve for forming and interrupting fluid communication between said inlet conduit and a fluid supply, a second valve for forming and interrupting fluid communication between said fluid outlet conduit and the elongate exhaust conduit, a third valve arranged in the exhaust conduit near the downstream end thereof, and a three-way valve arranged in the fluid outlet conduit for switching fluid flow from said pressure vessel either into the exhaust conduit or into the buffer vessel; and the apparatus further comprising means for disconnecting the first valve from the fluid supply, means for disconnecting the second valve from the elongate exhaust conduit, and means for measuring the weight of the contents of the pressure vessel, the buffer vessel and of said inlet and outlet conduits.

2. The apparatus of claim 1, wherein a pressure gauge is connected to said elongate exhaust conduit.

3. The apparatus of claim 1, wherein a temperature sensing device is mounted in the interior of said pressure vessel.

4. The apparatus of claim 1, wherein the volume of said buffer vessel is less than the volume of said pressure vessel.

5. The apparatus of claim 1, wherein the length of the elongate exhaust conduit is more than 5 m.

6. A method of determining the density of a hydrocarbon liquid at elevated pressure using the apparatus comprising the steps of:

opening first, second and third valves and allowing a hydrocarbon liquid to flow from a fluid supply via an inlet conduit, a pressure vessel and an outlet conduit into an elongate exhaust conduit;

continuing said flow at least until the liquid passes through said third valve;

closing said first and second valves and linking the pressure vessel with the buffer vessel by switching the three-way valve;

disconnecting the first valve from the fluid supply, disconnecting the second valve from the fluid exhaust conduit;

determining the mass of the liquid contained in said pressure and buffer vessel and in said inlet and outlet conduit; and calculating the density of the contained liquid using the liquid mass thus determined.

7. The method of claim 6, wherein the hydrocarbon liquid is a liquefied petroleum gas.

8. The method of claim 6, wherein the third valve is a flow control valve and the flow rate of the fluid stream through the apparatus after opening of said first, second and third valves is controlled by adjusting the flow opening of said flow control valve.

9. The method of claim 6, wherein prior to allowing said liquid to enter the conduits and vessels of the apparatus, these conduits and vessels are purged with a gas or liquid which is injected at a pressure substantially equal to the pressure of the liquid to be sampled.

* * * * *